United States Patent [19]
Lundberg et al.

[11] Patent Number: 5,812,871
[45] Date of Patent: Sep. 22, 1998

[54] DATA PROCESSING SYSTEM AND A METHOD OF OPTIMIZING AN OPERATION OF THE DATA PROCESSING SYSTEM

[75] Inventors: James R. Lundberg; C. Thomas Glover; Matthew R. Nixon, all of Austin, Tex.

[73] Assignee: Motorola Inc., Schaumburg, Ill.

[21] Appl. No.: 497,571

[22] Filed: Jun. 30, 1995

[51] Int. Cl.⁶ .................................................. G06F 13/00
[52] U.S. Cl. ........................................................ 395/800.43
[58] Field of Search .............................. 395/800, 800.43, 395/800.26, 430, 750.03, 750.05; 365/230, 185.33, 229, 195; 235/492

[56] References Cited

U.S. PATENT DOCUMENTS

| | | | |
|---|---|---|---|
| 4,573,117 | 2/1986 | Boney | 364/200 |
| 4,669,059 | 5/1987 | Little et al. | 364/900 |
| 4,758,945 | 7/1988 | Remedi | 364/200 |
| 5,371,793 | 12/1994 | Kimura | 365/189.07 |
| 5,388,248 | 2/1995 | Robinson et al. | 235/492 |
| 5,428,579 | 6/1995 | Robinson et al. | 365/230.03 |
| 5,483,659 | 1/1996 | Yamamura | 395/800 |
| 5,511,203 | 4/1996 | Wisor et al. | 395/750 |
| 5,560,035 | 9/1996 | Garg et al. | 395/800 |

FOREIGN PATENT DOCUMENTS

| | | | |
|---|---|---|---|
| 7-7770 | 1/1995 | Japan | H04Q 9/00 |
| 911501 | 3/1988 | U.S.S.R. | G06F 3/04 |

OTHER PUBLICATIONS

Biggs, et al.; "A 1 Watt 68040–Compatible Microprocessor;" IEEE Symposium on Low Power Electronics; pp. 12–13 (1994).

PCMCIA PC Card Standard—Release 2.0; Personal Computer Memory Card International Association; pp. 5–2 to 5–26 (1991).

Ong, et al., "Power–Conscious Software Design—A Framework for Modeling Software on Hardware", 1994 IEEE Symposium on Low Power Electronics, Digest of Technical Papers, pp. 36–37, Oct. 1994.

Primary Examiner—Ellis B. Ramirez
Attorney, Agent, or Firm—George R. Meyer

[57] ABSTRACT

A data processing system has operational management registers containing attributes that are used during an application to optimize operation of the data processing system for energy, time, or costs based on the type of operation being performed by the data processing system. The data processing system can implement a different operation management technique dynamically while the program is active within the data processing system.

26 Claims, 2 Drawing Sheets

DATA PROCESSING SYSTEM AND A METHOD OF OPTIMIZING AN OPERATION OF THE DATA PROCESSING SYSTEM

FIELD OF THE INVENTION

The present invention relates to data processing systems, and in particular, to optimizing operations of data processing systems.

BACKGROUND OF THE INVENTION

Data processing systems typically include a central processing unit (CPU) that is used to process data and other information within the data processing system. As technology has advanced, the speed at which a data processing system operates has increased. Also, the power consumption has also increased because the number of transistors has increased.

In many instances, the CPU does not need to operate at full speed all the time. Several power saving techniques are available to an operator of the data processing system to reduce the amount of power consumed. One way to reduce power is to change the speed at which the CPU operates. In one example, a CPU can operate at 25 megahertz or 16 megahertz. The operator can choose to run the CPU at 16 megahertz to reduce power consumption; however, for a processing intensive operation, the time needed to perform that operation increases.

Another method of reducing power consumption is to use a timer to determine when a computer should be fully or partially powered down ("time-out technique"). For example, after ten seconds of inactivity within the data processing system, it is partially or completely shut down.

A problem with many of these techniques is that they are not dynamic in that they do not allow an application (i.e., software program) to optimize the operation of a data processing system during the execution of the application. With the reduced clock speed, all operations take longer. With the time-out technique, the CPU usually runs at full speed until a time out condition has occurred.

A need exists for better operational management of the data processing system. Moreover, the data processing system should allow applications (i.e., software programs) to dynamically determine the optimal operation management technique and implement that optimal operation management technique during execution of the application.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures are exaggerated relative to other elements to help to improve understanding of embodiment(s) of the present invention.

DETAILED DESCRIPTION

A data processing system has operational management registers that are used during an application to optimize the data processing system for energy, time, or cost based on the type of operation being performed by the data processing system. The data processing system can change an operation management technique dynamically while the application is active within the data processing system. The present invention is better understood when read in conjunction with the description below.

Data Processing System

Figure 1:
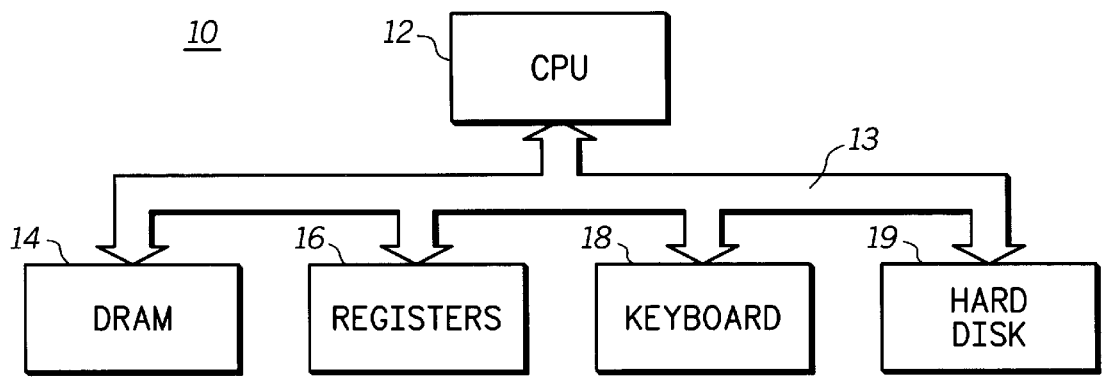
FIG. 1 includes a schematic diagram of a data processing system in accordance with an embodiment of the present invention.

FIG. 1 includes a schematic view of a data processing system 10. Examples of the data processing system 10 include a personal computer, automated equipment (i.e., a robot, etc.), or the like. The data processing system 10 includes a central processing unit (CPU) 12, a dynamic random access memory (DRAM) 14, a bank of registers 16, a keyboard 18, and a hard disk 19. The CPU 12 is a specific type of processor. In alternate embodiments, the data processing system 10 can have a plurality of processors with a single bank of registers or different banks of registers. The CPU 12 is connected to these other components by bus 13. In an actual data processing system 10, the CPU may not be coupled to all the items shown or may be coupled to other items. In addition, bus 13 can include a plurality of individual buses. Also, buses may couple together any of the non-CPU items within FIG. 1.

Figure 2:
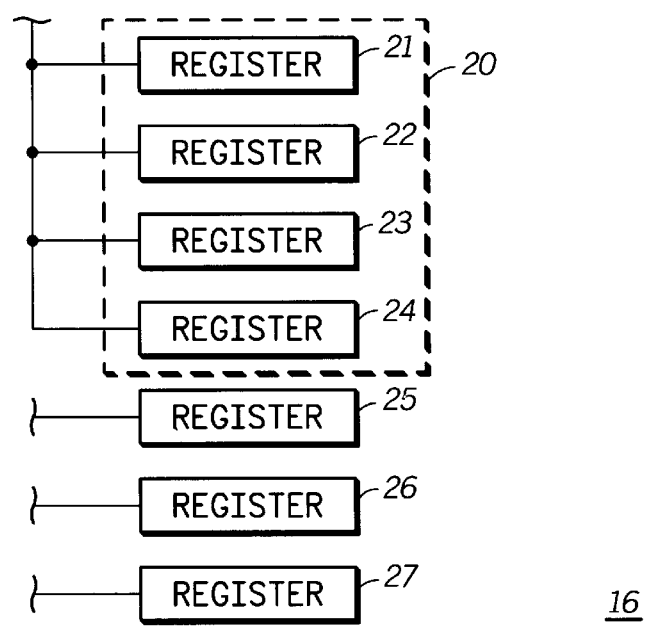
FIG. 2 includes a schematic drawing of registers used within the data processing system in accordance with an embodiment of the present invention.

FIG. 2 includes a schematic view of a portion of the bank of registers 16 that includes registers 21–27. Registers 21–24 are part of an operation management array 20. Registers 25–27 are within the bank of registers 16 but are not related to the operation management array 20. In alternate embodiments, more registers or fewer registers can be part of the bank of registers 16 or the array 20.

In this particular embodiment, register 21 has attributes that correspond to operating the data processing system at full power, register 22 has attributes that correspond to operating the data processing system at one-half of the full speed, register 23 has attributes that correspond to operating the data processing system at one-quarter of the full speed; and register 24 has attributes that correspond to a clock gating technique. Other types of operational management techniques could be used. The registers described are meant to be illustrative and not limiting.

Figure 3:
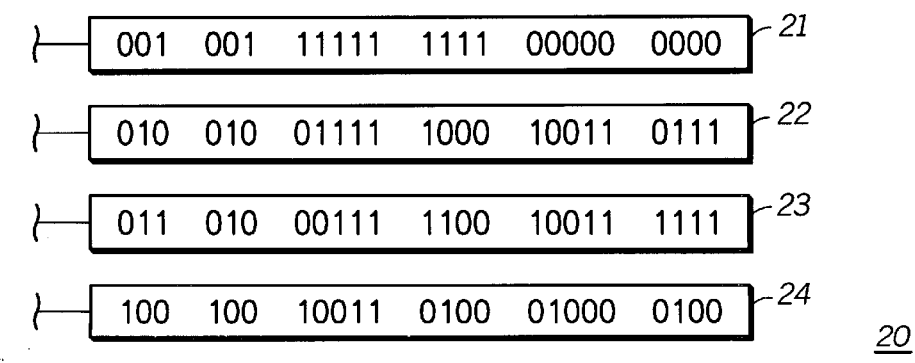
FIG. 3 includes attributes of some of the registers within the data processing system in accordance with an embodiment of the present invention.

FIG. 3 includes the contents of the registers shown in binary form within registers 21–24 of the array 20. The registers can be in the form of floating gate memory cells, static or dynamic random-access memory cells, or the like. In this particular embodiment, each register has 24 bits of data.

Within each register, the three most significant bit positions represent an index identifier. Each register has a unique index identifier. The next three most significant bit positions represent the type of operational management technique. Registers 22 and 23 have the same type of operational management technique because both are fractions of full speed. In this particular embodiment, the rest of the bit positions have attributes that can be represented as absolute or relative values. The next five most significant bit positions represent the amount of power consumed for that particular operational management technique. In this embodiment, all ones correspond to full power, and all zeros correspond to no power. Register 22 uses about half the power of register 21, and register 23 uses about half the power of register 22.

The next four most significant bit positions represent how long operations will take to perform. These four bit positions are referred to as the "performance" attribute. For registers 22–24, the performance attribute is inversely related to power. For registers 22–24, those registers having a higher binary value for the power attribute have a lower binary value for the performance attribute. Register 21 has all ones for the performance attribute. Typically, some operations can take a long time to perform even at full power. By configuring the performance attribute of register 21 to have all ones, register 21 is not chosen if energy conservation is an issue as described in more detail below. In this manner, full power is used for processor intensive operations.

The next five significant bit positions are referred to as the "overhead" attribute that represents the power consumed in going from full power to reduced power and back to full power. The four least significant bit positions represent the time elapsed when going from full power to reduced power and back to full power. These four bit positions are referred to as the "latency" attribute. For example, an operational management technique does not supply power to the hard disk 19 unless data from the hard disk 19 is requested. The overhead and latency attributes indicate how much power and time are used to cut off power to the hard disk 19 and to restore it to full use.

Register 21 has zeros for the overhead and latency attributes because register 21 corresponds to full power. Registers 22–24 indicate that the data processing system 10 takes a power and time loss when any operation management technique in registers 22–24 is used. Registers 22 and 23 have the same overhead attribute, but the latency for register 23 is larger than register 22.

In alternate embodiments, more or fewer attributes can be used in the registers 21–24. For example, an attribute could be added that is related to the cost of energy to operate the data processing system 10. Still another attribute could be added that reflects the labor cost of the operator. In any event, the registers 21–24 have at least one attribute.

The contents of the registers 21–24 can be set by an integrated circuit designer, a software programmer as part of a software program, or an operator of the data processing system. Some of the contents of registers 21–24 can be set by one person, and other registers 21–24 can be set by another person. For example, assume that registers 21–24 include attributes related to power, performance, overhead, latency, energy costs, and labor costs. The integrated circuit manufacturer can set all contents of the registers except for energy and labor costs. The operator can set the energy and labor costs attributes to reflect local energy costs and the operator's wages per unit time. Other combinations are possible.

The CPU and registers can reside on the same integrated circuit or different integrated circuits. Also, as little as one register can be used. If the attributes of that one register are not used, the data processing system would default to full power. In this manner, one operation management technique is the normal operation of the CPU, and another operation management technique corresponds to the attributes in the one register.

Operation of the Data Processing System

Figure 4:
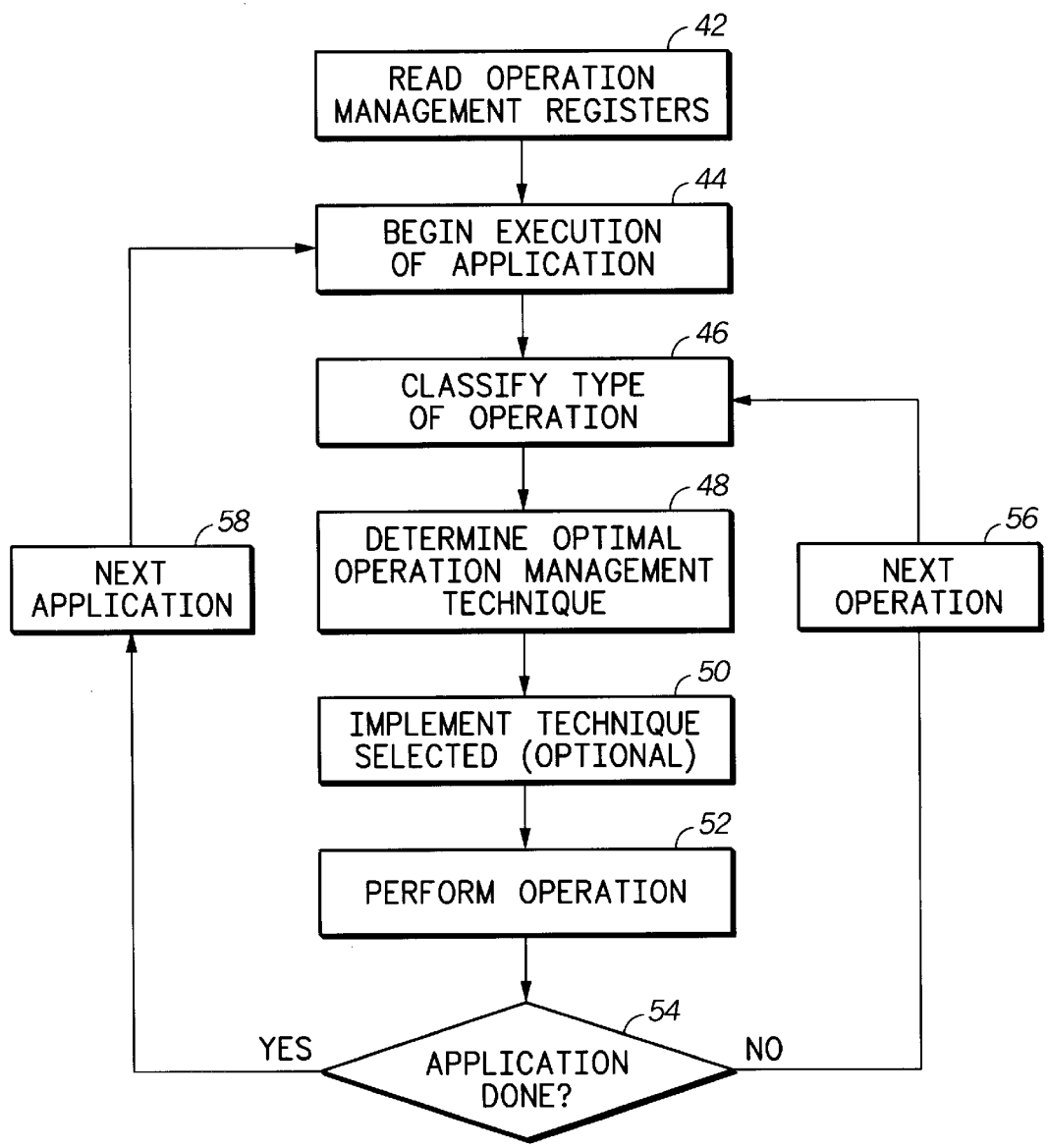
FIG. 4 includes a process flow diagram of one embodiment of the present invention.

FIG. 4 includes a process flow diagram of one embodiment of the present invention. Clearly, the present invention is not limited solely to this embodiment and others can be used. After a data processing system has booted up its operating system, the CPU reads the operation management registers (step 42). In another embodiment, the operation management registers can be read before or after steps 44 and 46. The data processing system begins execution of an application (i.e., software program) as seen in step 44. Operator input into the data processing system may be required to launch the application. The data processing system classifies the type of operation to be performed (step 46).

The data processing system determines the optimal operation management technique to be implemented based on the type of operation that is to be performed (step 48). The optimal operation management technique is implemented (step 50). Step 50 is optional because a prior operation and the operation to be performed may use the same operation management technique. There is no reason to "re-implement" the operation management technique if it is active. In addition, the data processing system can determine that implementing a different operation management technique is undesired or at best makes an insignificant amount of difference, the data processing should not implement that different operation management technique. After the implementation, if any, the data processing system performs the operation (step 52).

The data processing system then determines whether the application is done (step 54). If the application is not done, the data processing proceeds onto the next operation (step 56). The next operation is classified (step 46) and the data processing system continues with steps 48, 50, 52, and 54. If the application is done, the next application is selected (step 58) and begins execution (step 44). Steps 46, 48, 50, 52, and 54 are performed until the next application is done.

All steps in FIG. 4 can be performed by the data processing system. Operator input usually selects which application to execute, but the actual execution of the application is performed by the data processing system.

As envisioned, the integrated circuit designer notifies the software programmer of the existence of the registers and how they are accessed. The software programmer writes an application (i.e., software program) such that when a significant change in operation occurs, the data processing systems determines the optimal operation management technique and implements it before performing the operation. Examples below further illustrate how the operation of a data processing system is affected.

In a first example, the data processing system is used with a mail server (another data processing system) to communicate with another operator of still another data processing system at a remote site (electronic mail). Usually, the speed at which messages can be sent is limited by the speed at which the operators can type and not by the data processing systems. With keyboard entry, the data processing system is only active for a small portion of the time and is waiting for additional instructions as keystrokes occur. These keystrokes are milliseconds apart or possibly even longer. Referring to steps 46–52 of FIG. 4, the data processing system determines that the operation is keyboard entry. Because the operation has many periods of relative inactivity, the data processing system chooses to operate at the quarter clock speed corresponding to register 23. If the operation management technique does not correspond to the attributes in register 23, the operation management technique is changed to correspond to the attributes of register 23. After the change is made, keyboard entry continues.

The next operation for the data processing system could be to answer a questionnaire on the electronic mail system. In this particular case, the keystrokes will be relatively quick between hitting an entry key. In this particular case, the data processing system implements the operation management technique that corresponds to register 22.

After the first application is done, a new application can begin execution. The second application can be a spreadsheet. When the spreadsheet program is launched, the data processing system operates at full power. If the data processing system is not already at full power, the data processing implements the operation management technique that corresponds to register 21. After the spreadsheet program is launched, three basic types of operations can occur: (1) entering data (keyboard entry); (2) recalculating values of one or more cells within the spreadsheet; or (3) forming a graphical representation of data within the spreadsheet. Keyboard entry has been discussed in a previous example. For keyboard entry, the data processing system implements the operation management technique that corresponds to register 23.

After data is typed, it is typically placed into a cell within the spreadsheet by hitting "return" or "enter" keys of a keyboard. In many instances, mathematical formulas are present within some of the cells of the spreadsheet. When data is entered into one cell of the spreadsheet, several other cells can be affected and require recalculation of values within those several cells. Assume that recalculation follows the keyboard entry. The operation management technique corresponds to register 23.

After the "return" or "enter" key is hit, the spreadsheet software program instructs the CPU to expect recalculation activity. After the CPU determines that a different operation management technique is optimal, the CPU implements the optimal operation management operation. For this operation, the operation management technique that is implemented corresponds to register 24. The recalculation is then performed. After the recalculation is completed, typically keyboard entry continues. Therefore, after recalculation activity, the data processing systems changes the operation management technique that corresponds to register 23 because the spreadsheet software program has instructed the data processing system to expect additional keyboard entry after recalculation.

After all data is entered, a graphical representation of the data can be generated (a new operation). Graphics are typically intensive on processing. An operator of the data processing system prepares the data processing system for graphical representation by setting data ranges, setting scales, making data labels, or the like. When the preparation is finished, the operator instructs the data processing system to perform the graphics operation. The data processing system knows that a graphics operation needs to be performed. The spreadsheet software program instructs the data processing system to use full power for graphics operations. The data processing system implements the operation management technique that corresponds to register 21. The graphics operation by the data processing system is performed. After the graphics operation, a hard copy of the graphical representation can be printed. After the printing, the data processing system implements the operation management technique that corresponds to register 23 because keyboard entry from an operator typically follows.

These examples illustrate how the registers can be used to optimize the operation of a data processing system. Other methods are possible. In the spreadsheet example, the keyboard entry and recalculation of cells can be alternated frequently. In this case, it may not make sense to frequently change the operation management techniques between keyboard entry and recalculation because of the overhead or latency associated with changing the operation management techniques. In this case, the operation management technique for both keyboard entry and recalculation corresponds to one register, such as register 23 or 24. Alternatively, a register having an operation management technique between the two registers can be used. For example, register 22 has a power attribute having a power level between registers 23 and 24. By combining keyboard entry and recalculation into one operation management technique, overhead and latency can be reduced without significantly impacting energy used by the data processing system or time of operation.

Virtually any software program can be used with the registers. For word processing software programs, launching the program and using macros or print merges are performed at full speed while all other operations (keyboard entry, printing, or the like) are performed at a lower power. If a data processing system has only one register, the operation management technique of that register can be implemented when operator interfacing with the data processing system is frequent. When operator interfacing is less, the data processing system can default to the standard machine settings.

Benefits

The operation management registers as described above can be used to optimize energy conservation, optimize total amount of time needed to run a program, optimize cost of operation, extend the amount of time an application is available for execution, or any combination thereof. The software instructs the data processing system to check the operation management technique when a type of operation to be performed is significantly different from a previous operation. The data processing system determines the optimal operation management technique based on the operation to be performed and implements a different operation management technique as needed. Software programs can be written to optimize the operation of a data processing system based on energy consumption, time, money, or a combination of these.

Unlike previous techniques, the operation management technique of the data processing system is changed dynamically by the data processing system as the application is active. Previously, an operation management technique can be set before an application is run, but is not changed until the application has finished. The present invention can be used in conjunction with one or more of the previous techniques.

The registers are independent of source code. Any software running on the data processing system can be used with these registers. The software programmers determine what activity they expect to occur with their software program and modify the operation management technique of the processor based upon attributes within the operation management registers. If the software programmer knows the attributes and the operation management technique that should be used, the application can be written to change the operation management technique without performing any analysis of the attributes within the registers.

Another advantage of the present invention is that it does not require the rebuilding of firmware. Some types of operation management techniques are specific to firmware and require that the firmware can be changed. The software program cannot change the operation management technique of the data processing system when changes in firmware are required.

In the foregoing specification, the invention has been described with reference to specific embodiments thereof. However, it will be evident that various modifications and changes can be made thereto without departing from the scope of the invention as set forth in the appended claims. Accordingly, the specification and figures are to be regarded in an illustrative rather than a restrictive sense.

We claim:

1. A data processing system comprising:
   a processor; and
   a first, second, and third register coupled to the processor, wherein each of the first, second, and third registers has a first attribute that is power and a second attribute selected from a group consisting of performance, overhead, and latency, wherein:
   the first register corresponds to a first operation management technique;
   the second register corresponds to a second operation management technique; and
   the third register corresponds to a third operation management technique.

2. The data processing system of claim 1, wherein the processor, the first register, the second register, and the third register are on a same integrated circuit.

3. The data processing system of claim 1, wherein the data processing system is capable of receiving instructions from an application, wherein the instructions are to instruct the data processing unit to access at least one of the first, second, and third registers, and wherein the data processing system is capable of accessing the at least one register.

4. The data processing system of claim 3, wherein the application is selected from a group consisting of a word processing application, a spreadsheet application, a graphics application, and an electronic mailing application.

5. The data processing system of claim 3, wherein each of the first, second, and third register has:
   a plurality of attributes including the first and second attributes; and
   a same number and kind of attributes.

6. The data processing system of claim 1, wherein:
   the processor is on a first integrated circuit; and
   the first register, the second register, and third register are on a second integrated circuit.

7. The data processing system of claim 1, wherein each of the first, second, and third register has:
   a plurality of attributes including the first and second attributes; and
   a same number of attributes.

8. The data processing system of claim 1, wherein the first register further comprises a third attribute selected from a group consisting of performance, overhead, and latency, wherein the third attribute is different from the second attribute.

9. The data processing system of claim 8, wherein the first register further comprises a fourth attribute selected from a group consisting of performance, overhead, and latency, wherein the fourth attribute is different from the second attribute and the third attribute.

10. The data processing system of claim 1, wherein the data processing system is capable of receiving instructions from an application, wherein the instructions are to instruct the data processing unit to access the first, second, and third registers during different clock cycles, and wherein the data processing system is capable of accessing the first, second, and third registers.

11. The data processing system of claim 10, wherein the application is selected from a group consisting of a word processing application, a spreadsheet application, a graphics application, and an electronic mailing application.

12. The data processing system of claim 10, wherein each of the first, second, and third register has:
   a plurality of attributes including the first and second attributes; and
   a same number and kind of attributes.

13. A method of optimizing an operation of a data processing system comprising the steps of:
   reading a first, second, and third register wherein each of the first, second, and third registers includes an operation management technique, wherein the first register has a first attribute which is power and a second attribute selected from a group consisting of performance, overhead, and latency;
   classifying a type of operation to be performed; and
   in response to the step of classifying, determining an operation management technique to be implemented before performing the operation,
   wherein the steps of the method are performed by the data processing system.

14. The method of claim 13, wherein the operation is an operation of an application.

15. The method of claim 13, wherein:
   the first register has a third attribute different from the second attribute; and
   the step of determining analyzes the second and third attributes.

16. The method of claim 13, further comprising steps of:
   implementing an operation management technique corresponding to one of the first, second, and third registers; and
   performing the operation.

17. The method of claim 13, further comprising a step of performing the operation, wherein an operation management technique of one of the registers is not implemented before the step of performing the operation.

18. A method of optimizing an operation of a data processing system comprising the steps of:
   reading a plurality of registers that each include an operation management technique, wherein each register has a plurality of attributes selected from a group consisting of power, performance, overhead, and latency;
   classifying a type of a first operation to be performed;
   in response to the step of classifying the type of the first operation, determining an operation management technique to be implemented before performing the first operation;
   performing the first operation;
   classifying a type of a second operation to be performed;
   in response to the step of classifying the type of the second operation, determining an operation management technique to be implemented before performing the second operation; and
   performing the second operation,
   wherein the steps of the method are performed by the data processing system.

19. The method of claim 18, wherein the first and second operations are operations of an application.

20. The method of claim 18, wherein at least two of the attributes of the plurality of attributes are selected from a group consisting of performance, overhead, and latency.

21. The method of claim 18, further comprising a step of implementing an operation management technique that corresponds to one the plurality of registers before performing the first or second operation.

22. The method of claim 18, further comprising steps of:

implementing an operation management technique that corresponds to one of the registers before the step of performing the first operation; and implementing an operation management technique that corresponds to a different register before the step of performing the second operation.

23. The method of claim 18, wherein the operation management technique is not changed before each of the steps of performing the first and second operations.

24. A method of optimizing an operation of an application on a data processing system, the method comprising the steps of:

performing a first operation of the application;

classifying a type of a second operation of the application to be performed;

in response to the step of classifying, implementing an operation management technique that is different from an operation management technique used for the step of performing the first operation; and performing the second operation of the application, wherein the steps of the method are performed by the data processing system.

25. The method of claim 24, wherein the operation management technique corresponds to a register having a first attribute that is power and a second attribute selected from a group consisting of performance, overhead, and latency.

26. The method of claim 24, wherein the operation management technique corresponds to a register having at least two attributes selected from a group consisting of performance, overhead, and latency.

* * * * *